(12) United States Patent
Han et al.

(10) Patent No.: US 11,586,045 B2
(45) Date of Patent: Feb. 21, 2023

(54) NEAR-EYE DISPLAY APPARATUS

(71) Applicants: Beijing BOE Optoelectronics Technology Co., Ltd., Beijing (CN); BOE Technology Group Co., Ltd., Beijing (CN)

(72) Inventors: Na Han, Beijing (CN); Chenru Wang, Beijing (CN); Ruijun Dong, Beijing (CN); Yulong Wu, Beijing (CN); Ke Li, Beijing (CN); Jiarong Bai, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 196 days.

(21) Appl. No.: 17/206,320

(22) Filed: Mar. 19, 2021

(65) Prior Publication Data
US 2022/0099974 A1 Mar. 31, 2022

(30) Foreign Application Priority Data
Sep. 29, 2020 (CN) .......................... 202011047412.2

(51) Int. Cl.
*G02B 27/01* (2006.01)
*G02B 27/28* (2006.01)
*G02B 27/30* (2006.01)
*G02F 1/1335* (2006.01)

(52) U.S. Cl.
CPC ....... *G02B 27/0172* (2013.01); *G02B 27/286* (2013.01); *G02B 27/30* (2013.01); *G02F 1/133541* (2021.01)

(58) Field of Classification Search
CPC .................................................. G02B 27/0172
See application file for complete search history.

(56) References Cited

U.S. PATENT DOCUMENTS 11,181,815 B1* 11/2021 Wheelwright ..... G02B 27/0093
2021/0159373 A1* 5/2021 Grundmann ....... G02B 27/4272

* cited by examiner

*Primary Examiner* — Edmond C Lau
(74) *Attorney, Agent, or Firm* — ArentFox Schiff LLP; Michael Fainberg

(57) ABSTRACT

The present disclosure discloses a near-eye display apparatus including: a first display screen and a second display screen; and a first collimating lens, a second collimating lens, a first polarization converter which converts emitted light of the first display screen into first circularly polarized light, a second polarization converter which converts emitted light of the second display screen into second circularly polarized light, a waveguide plate configured to conduct the first circularly polarized light and the second circularly polarized light, and a super lens which is located in a light emitting region of the waveguide plate.

16 Claims, 14 Drawing Sheets

NEAR-EYE DISPLAY APPARATUS

This application claims priority to Chinese Patent Application No. 202011047412.2, filed on Sep. 29, 2020, which is hereby incorporated by reference in its entirety.

FIELD

The present disclosure relates to the field of display, and particularly to a near-eye display apparatus.

BACKGROUND

Near-eye display is currently a hot research topic, involving aspects such as virtual reality display in the form of helmets and augmented reality display in the form of smart glasses. Near-eye display can provide people with an unprecedented sense of interaction, and has important application value in many fields such as telemedicine, industrial design, education, military virtual training, and entertainment.

The Virtual Reality (VR) technology presents a fully enclosed virtual environment, and the Augmented Reality (AR) technology is an augmented projection method that superimposes virtual scenes on the real environment. These two popular display methods have been introduced to the public life and widely applied.

SUMMARY

The embodiment of the present disclosure provides a near-eye display apparatus, including: a first display screen configured to display a first image; a second display screen configured to display a second image; a first collimating lens located on a light emitting side of the first display screen and configured to collimate emitted light of the first display screen; a second collimating lens located on a light emitting side of the second display screen and configured to collimate emitted light of the second display screen; a first polarization converter located on the light emitting side of the first display screen and configured to convert the emitted light of the first display screen into first circularly polarized light; a second polarization converter located on the light emitting side of the second display screen and configured to convert the emitted light of the second display screen into second circularly polarized light; where rotation directions of the first circularly polarized light and the second circularly polarized light are opposite; a waveguide plate located on a side of the first collimating lens facing away from the first display screen, and on a side of the second collimating lens facing away from the second display screen; wherein the waveguide plate is configured to conduct light rays; and the waveguide plate includes: a light incident region and a light emitting region; a coupling-in grating located in the light incident region of the waveguide plate and configured to couple the first circularly polarized light and the second circularly polarized light into the waveguide plate for conduction; and a super lens located in the light emitting region of the waveguide plate and configured to focus the first circularly polarized light at a first focal length, and the second circularly polarized light at a second focal length; wherein the first focal length and the second focal length are different.

In some embodiments of the present disclosure, the first polarization converter is located between the first display screen and the first collimating lens; or, the first polarization converter is located on the side of the first collimating lens facing away from the first display screen; and the second polarization converter is located between the second display screen and the second collimating lens; or, the second polarization converter is located on the side of the second collimating lens facing away from the second display screen.

In some embodiments of the present disclosure, the first display screen and the second display screen are one of a liquid crystal display, an organic light emitting diode display, a micro organic light emitting diode display, a light emitting diode display, or a micro light emitting diode display.

In some embodiments of the present disclosure, the emitted light of the first display screen and the emitted light of the second display screen are linearly polarized light; and the first polarization converter is a first phase retarder, and the second polarization converter is a second phase retarder.

In some embodiments of the present disclosure, the emitted light of the first display screen and the emitted light of the second display screen are natural light; the first polarization converter includes: a first polarizer located on the light emitting side of the first display screen; and a first phase retarder located on a side of the first polarizer facing away from the first display screen; and the second polarization converter includes: a second polarizer located on the light emitting side of the second display screen; and a second phase retarder located on a side of the second polarizer facing away from the second display screen.

In some embodiments of the present disclosure, the first phase retarder and the second phase retarder are quarter-wave plates.

In some embodiments of the present disclosure, the light incident region and the light emitting region are located on a surface of a side of the waveguide plate facing a human eye; or, the light emitting region is located on a surface of a side of the waveguide plate facing the human eye, and the light incident region is located on a surface of a side of the waveguide plate facing away from the human eye.

In some embodiments of the present disclosure, the coupling-in grating is a surface embossment type diffraction grating; and grating parameters of the surface embossment type diffraction grating satisfy that −1 order or 1 order diffraction efficiency reaches over 90%.

In some embodiments of the present disclosure, the light emitting region is divided into a first region and a second region; and the super lens includes: a plurality of first micro-nano structure units, which are distributed in the first region and configured to focus the first circularly polarized light at the first focal length; and a plurality of second micro-nano structure units, which are distributed in the second region and configured to focus the second circularly polarized light at the second focal length; where rotation angles of the first micro-nano structure units and the second micro-nano structure units are different.

In some embodiments of the present disclosure, the rotation angle of the first micro-nano structure units satisfies the following relationship:

$$\theta_1(x, y) = \frac{\pi}{\lambda_{in}}\left(\sqrt{r^2 + f_1^2} - f_1\right);$$

and the rotation angle of the second micro-nano structure units satisfies the following relationship:

$$\theta_2(x, y) = -\frac{\pi}{\lambda_{in}}\left(\sqrt{r^2 + f_2^2} - f_2\right).$$

Where, $\theta_1(x,y)$ represents the rotation angle of the first micro-nano structure units, $\theta_2(x,y)$ represents the rotation angle of the second micro-nano structure units, $f_1$ represents the first focal length, $f_2$ represents the second focal length, and $\lambda_{in}$ represents a wavelength of incident light.

In some embodiments of the present disclosure, the area of the first region is equal to the area of the second region.

In some embodiments of the present disclosure, a shape of the first region is a circle, and a shape of the second region is a circular ring surrounding the first region.

In some embodiments of the present disclosure, the first collimating lens includes at least one lens; and the second collimating lens includes at least one lens.

In some embodiments of the present disclosure, the lens in the first collimating lens is one of a spherical mirror, an aspheric mirror or a free-form surface mirror; and the lens in the second collimating lens is one of a spherical mirror, an aspheric mirror or a free-form surface mirror.

In some embodiments of the present disclosure, the near-eye display apparatus is an augmented reality device.

BRIEF DESCRIPTION OF THE DRAWINGS

In order to explain the technical solution of the embodiments of the present disclosure more clearly, the following will briefly introduce the drawings that need to be used in the embodiments of the present disclosure. Obviously, the drawings described below are only some embodiments of the present disclosure. For those of ordinary skill in the art, without creative work, other drawings can be obtained based on these drawings.

DETAILED DESCRIPTION OF THE EMBODIMENTS

Figure 1:
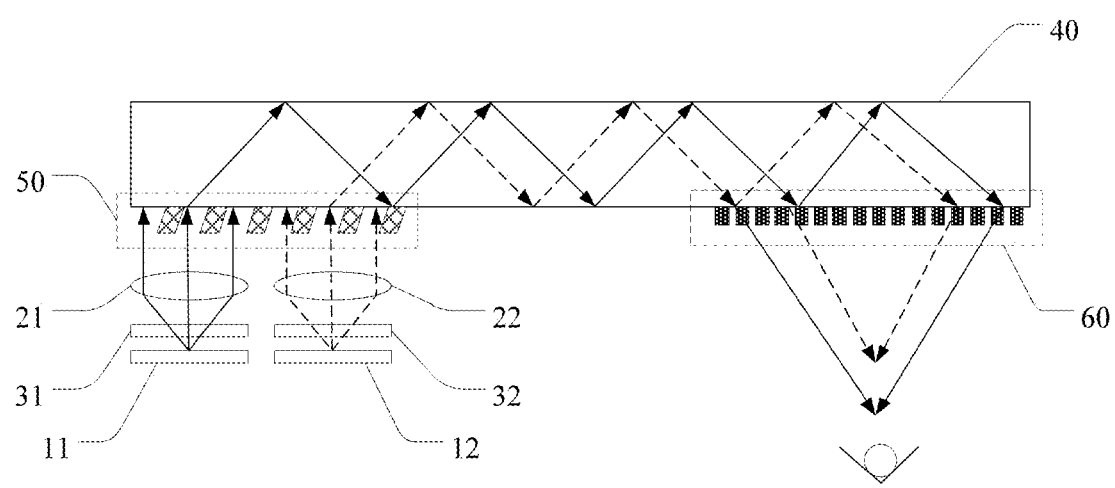
FIG. 1 is a first schematic structural diagram of a near-eye display apparatus provided by an embodiment of the present disclosure.

In order to make the above objectives, features, and advantages of the present disclosure more obvious and understandable, the present disclosure will be further described below in conjunction with the accompanying drawings and embodiments. However, example implementations can be implemented in various forms, and should not be understood to be limited in the implementations set forth herein; on the contrary, the provision of these implementations makes the present disclosure more comprehensive and complete, and fully conveys the concept of the example implementations to those skilled in the art. The same reference numerals in the figures indicate the same or similar structures, and thus their repeated description will be omitted. The words expressing positions and directions described in the present disclosure are all illustrated by taking the drawings as examples, but changes can also be made according to needs, and the changes are all included in the protection scope of the present disclosure. The drawings of the present disclosure are only configured to illustrate the relative position relationship and do not represent the true scale.

A near-eye display apparatus refers to a display device that is worn on the eyes of a user. For example, the near-eye display apparatus is usually presented in the form of glasses or a helmet. Near-eye display apparatuses can provide users with AR and VR experience. Among them, the AR near-eye display technology is to superimpose and display a virtual image generated by the near-eye display apparatus with a real image in the real world, so that the user can see the final augmented real image on a screen. The VR near-eye display technology is to display images of the left and right eyes on near-eye displays corresponding to the left and right eyes respectively, and the left and right eyes can synthesize stereo vision in the brain after obtaining image information with differences.

A near-eye display apparatus provided by the embodiments of the present disclosure is more in line with the situation of human eyes' viewing of real sceneries, and can eliminate the dizziness problem caused by human eyes focusing on the same position for too long time.

The near-eye display apparatus provided by specific embodiments of the present disclosure will be described in detail below in conjunction with the accompanying drawings.

Figure 2:
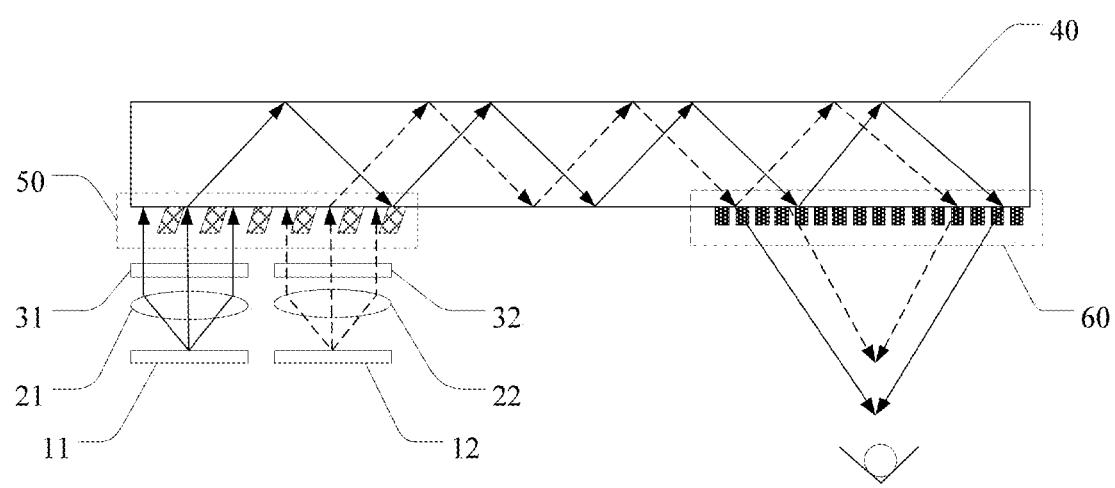
FIG. 2 is a second schematic structural diagram of a near-eye display apparatus provided by an embodiment of the present disclosure.

FIG. 1 and FIG. 2 are schematic structural diagrams of the near-eye display apparatus provided by the embodiments of the present disclosure.

With reference to FIG. 1 and FIG. 2, the present disclosure provides a near-eye display apparatus. The near-eye display apparatus includes: a first display screen 11, a second display screen 12, a first collimating lens 21, a second collimating lens 22, a first polarization converter 31, a second polarization converter 32, a waveguide plate 40, a coupling-in grating 50, and a super lens 60.

The first display screen 11 is configured to display a first image. The second display screen 12 is configured to display a second image. The first image and the second image are different images. In the embodiments of the present disclosure, one of the first image and the second image is a foreground image, and the other is a background image. The above-mentioned near-eye display apparatus provided by the embodiments of the present disclosure can finally focus the first image and the second image on different focal planes, so that a certain depth of field is generated between the foreground image and the background image, which is more in line with the situation of human eyes' viewing of real sceneries.

As shown in FIG. 1 and FIG. 2, in the embodiments of the present disclosure, the first display screen 11 and the second display screen 12 are arranged side by side, so that the first display screen 11 and the second display screen 12 display images in the same direction.

In some embodiments, the first display screen 11 and the second display screen 12 are one of a liquid crystal display, an organic light emitting diode display, a micro organic light emitting diode display, a light emitting diode display, or a micro light emitting diode display, etc.

A Liquid Crystal Display (LCD) includes a backlight module and a liquid crystal display panel. The liquid crystal display panel itself does not emit light and needs to rely on a light source provided by the backlight module to achieve brightness display. The imaging principle of the LCD is to place liquid crystals between two pieces of conductive glass, under driving by the electric field between two electrodes, which causes the electric field effect of twisting liquid crystal molecules to control the transmission or shielding function of the backlight, thereby displaying the image. If color filters are added, color images can be displayed. The liquid crystal display technology is mature, and a liquid crystal display screen has a lower cost and excellent performance.

Organic Light Emitting Diode (OLED) display is also called organic electric laser display, and organic light emitting semiconductor display. An OLED display is a kind of current-type organic light emitting device, which is a phenomenon of luminescence generated by the injection and recombination of carriers, and the luminous intensity is directly proportional to the injected current. Under the action of an electric field in an OLED, holes generated by an anode and electrons generated by a cathode will move, respectively get injected into a hole transport layer and an electron transport layer, and migrate to a light emitting layer. When both of them meet in the light emitting layer, energy excitons are generated, which excites light emitting molecules to finally produce visible light. The OLED display is a self-luminous display, so it does not need to be equipped with a backlight module, and the overall thickness of the device is small, which is conducive to the miniaturization of the near-eye display apparatus and further conducive to the installation of a whole machine.

A micro organic light emitting diode display focuses on miniaturization of a light emitting unit of an organic light emitting diode, so that more pixels can be arranged in a limited size, and the resolution of a display screen can be improved.

A Light Emitting Diode (LED) display is a display screen including an LED array, which uses LEDs as display sub-pixels, and realizes image display by controlling the display brightness of each LED. The LED display has the characteristics of high brightness, low power consumption, low voltage requirements, small size and portability, etc. The use of the LED display as a display screen in a near-eye display apparatus is beneficial to the miniaturization of the near-eye display apparatus.

A Micro-Light Emitting Diode (Micro-LED) display uses LED chips as light emitting units. Compared with traditional LEDs, Micro-LEDs have a smaller size, so more pixels can be set in a limited display area and the image resolution can be increased.

The first collimating lens 21 is located on a light emitting side of the first display screen 11 and is configured to collimate emitted light of the first display screen 11. The second collimating lens 22 is located on a light emitting side of the second display screen 12 and is configured to collimate emitted light of the second display screen 12.

In the near-eye display apparatus provided by the embodiments of the present disclosure, the light emitted from the display screen needs to be finally conducted in the waveguide plate, and the embodiments of the present disclosure use the coupling-in grating to couple the light emitted from the first display screen 11 and the second display screen 12 into the waveguide plate. In order to improve the utilization of light, in the embodiments of the present disclosure, the first collimating lens 21 is disposed on the light emitting side of the first display screen 11, and the second collimating lens 22 is disposed on the light emitting side of the second display screen 12 so as to make light rays collimated by the first collimating lens 21 and the second collimating lens 22 perpendicularly incident to the coupling-in grating.

In the embodiments of the present disclosure, the first collimating lens 21 includes at least one lens; and the second collimating lens 22 includes at least one lens. The first collimating lens 21 and the second collimating lens 22 can be designed as a single lens or in the form of a lens group. The first display screen 11 is disposed at a focal point of the first collimating lens 21, and the second display screen 12 is disposed at a focal point of the second collimating lens 22, so that the light emitted from the first display screen 11 can be fully collimated by the first collimating lens 21, and the light emitted from the second display screen 12 is fully collimated by the second collimating lens 22.

The lenses in the first collimating lens 21 and the second collimating lens 22 may be one of a spherical mirror, an aspheric mirror, or a free-form surface mirror. The spherical mirror has the advantages of simple design and low assembly precision requirements. The thickness of the aspherical mirror and the free-form surface mirror is relatively small, which can optimize the image quality, and they can be selected according to actual needs when performing optical design.

Materials of the lenses in the first collimating lens 21 and the second collimating lens 22 may be glass or plastic, etc.

The first polarization converter 31 is located on the light emitting side of the first display screen 11; and the second polarization converter 32 is located on the light emitting side of the second display screen 12. As shown in FIG. 1, the first polarization converter 31 is arranged between the first display screen 11 and the first collimating lens 21; and the second polarization converter 32 is arranged between the second display screen 12 and the second collimating lens 22. Alternatively, as shown in FIG. 2, the first polarization converter 31 is arranged on the side of the first collimating lens 21 facing away from the first display screen 11; and the second polarization converter 32 is arranged on the side of the second collimating lens 22 facing away from the second display screen 12.

The first polarization converter 31 is configured to convert the emitted light of the first display screen 11 into first circularly polarized light; and the second polarization converter 32 is configured to convert the emitted light of the second display screen 12 into second circularly polarized light. Rotation directions of the first circularly polarized light and the second circularly polarized light are opposite.

The first polarization converter 31 and the second polarization converter 32 are configured to convert a polarization state of light rays. This is because the super lens configured for imaging finally can focus the circularly polarized light in different rotation directions at different focal lengths, so that before the light enters the super lens, the light emitted from the first display screen 11 and the second display screen 12 need to be converted into the circularly polarized light with opposite rotation directions.

In the embodiments of the present disclosure, the first circularly polarized light may be left-handed circularly polarized light, and the second circularly polarized light may be right-handed circularly polarized light; or, the first circularly polarized light may be right-handed circularly polarized light, and the second circularly polarized light may be right-handed circularly polarized light.

In the embodiments of the present disclosure, the first display screen 11 and the second display screen 12 can be selected from various types of displays, and the polarization states of light emitted by different types of displays are also different.

When the first display screen 11 and the second display screen 12 are a liquid crystal display, an organic light emitting diode display, or a micro organic light emitting diode display, since the liquid crystal display and the organic light emitting diode display are provided with a polarizing layer on the outermost side, the emitted light of the liquid crystal display and the emitted light of the organic light emitting diode display are linearly polarized light. Then, the first polarization converter 31 and the second polarization converter 32 are configured to convert linearly polarized light into circularly polarized light.

With reference to FIG. 2, when the emitted light of the first display screen 11 and the emitted light of the second display screen 12 are linearly polarized light, the first polarization converter 31 is a first phase retarder, and the second polarization converter 32 is a second phase retarder.

The first phase retarder provides a first phase retardation, and the polarization direction of the linearly polarized light emitted by the first display screen 11 matches with the first phase retarder to convert the linearly polarized light emitted by the first display screen 11 into first circularly polarized light (for example, left-handed circularly polarized light). The second phase retarder can provide a second phase retardation, and the polarization direction of the linearly polarized light emitted by the second display screen 12 matches with the second phase retarder to convert the linearly polarized light emitted by the second display screen 12 into second circularly polarized light (for example, right-handed circularly polarized light).

When the first display screen 11 and the second display screen 12 are light emitting diode displays or micro light emitting diode displays, the emitted light of the light emitting diode displays and the emitted light of the micro light emitting diode displays are natural light. Then, at this time, the first polarization converter 31 and the second polarization converter 32 are configured to convert natural light into circularly polarized light.

Figure 3:
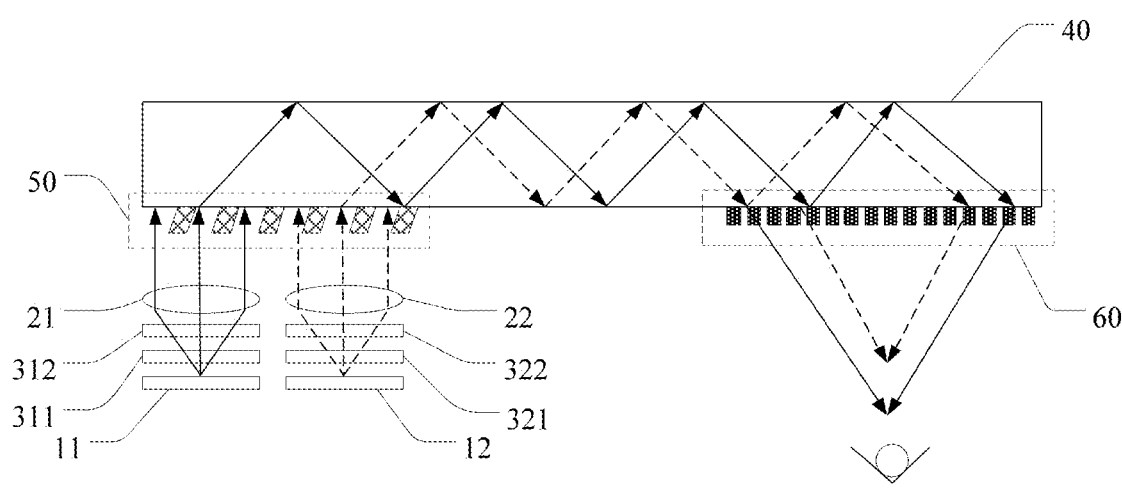
FIG. 3 is a third schematic structural diagram of a near-eye display apparatus provided by an embodiment of the present disclosure.

FIG. 3 is the third schematic structural diagram of the near-eye display apparatus provided by an embodiment of the present disclosure.

With reference to FIG. 3, when the emitted light of the first display screen 11 and the emitted light of the second display screen 12 are natural light, the first polarization converter 31 includes: a first polarizer 311 located on the light emitting side of the first display screen 11, and a first phase retarder 312 located on the side of the first polarizer 311 facing away from the first display screen 11; and the second polarization converter 32 includes: a second polarizer 321 located on the light emitting side of the second display screen 12, and a second phase retarder 322 located on the side of the second polarizer 321 facing away from the second display screen 12.

The natural light emitted by the first display screen 11 first enters the first polarizer 311 to be converted into linearly polarized light. The first phase retarder 312 can provide the first phase retardation, and the polarization direction of the first polarizer 311 is matched with that of the first phase retarder 312, which can convert the linearly polarized light converted by the first polarizer 311 into first circularly polarized light (for example, left-handed circularly polarized light); and the second phase retarder 322 can provide the second phase retardation, and the polarization direction of the second polarizer 321 is matched with the second phase retarder 322, which can convert the linearly polarized light converted by the second polarizer 321 into second circularly polarized light (for example, right-handed circularly polarized light).

In some embodiments, the first phase retarder and the second phase retarder mentioned above can be a quarter-wave plate. The angle between the optical axis of the quarter-wave plate and the polarization direction of the linearly polarized light is maintained at 45 degrees, which can convert the linearly polarized light into circularly polarized light.

The waveguide plate 40 is located on the side of the first collimating lens 21 facing away from the first display screen 11 and on the side of the second collimating lens 22 facing away from the second display screen 12. The waveguide plate 40 is configured to conduct light rays. The waveguide plate 40 is located on emission paths of the first collimating lens 21 and the second collimating lens 22 and can receive the collimated light transmitted by the first collimating lens 21 and the collimated light transmitted by the second collimating lens 22.

The waveguide plate 40 is configured to conduct light. The waveguide plate 40 is made of glass, and the refractive index is about 1.5. The refractive index of the waveguide plate 40 is greater than that of air. When light enters the waveguide plate 40 at an appropriate angle, formed light can enter from an optically dense medium to an optically thinner medium, so that the light can be totally reflected in the waveguide plate 40, and the light can be conducted in the waveguide plate 40.

As shown in FIGS. 1-3, the waveguide plate 40 includes: a light incident region and a light emitting region. The light incident region is used for disposing the coupling-in grating 50, and the light emitting region is used for disposing the super lens 60. As shown in FIGS. 1-3, the light incident region and the light emitting region are arranged on the same side of the waveguide plate facing a human eye, so that the coupling-in grating 50 and the super lens 60 are arranged on the side of the waveguide plate 40 facing the human eye.

Figure 4:
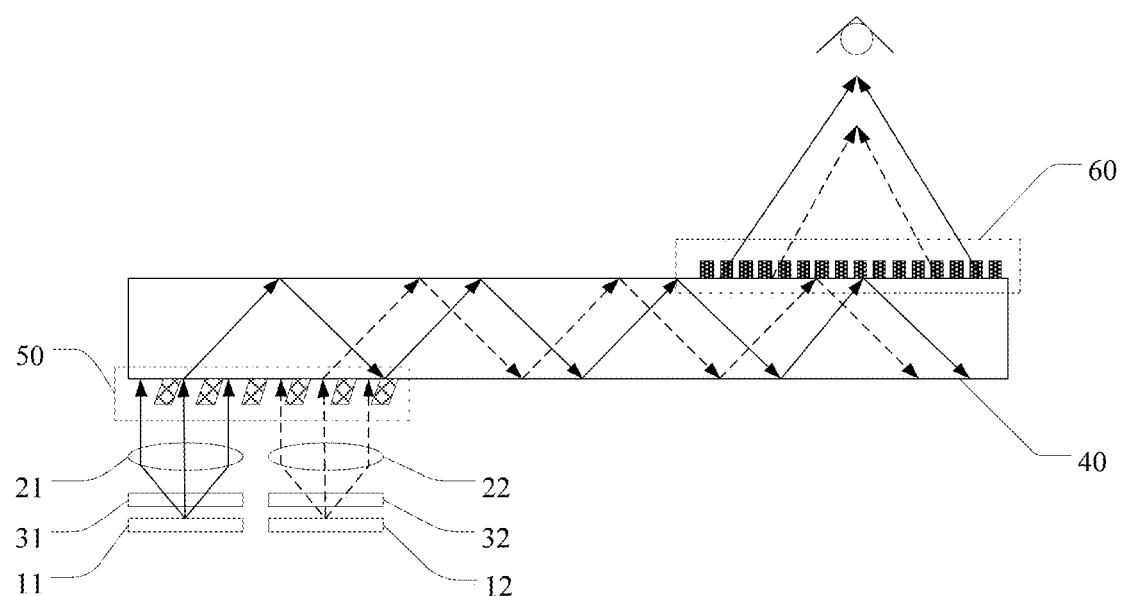
FIG. 4 is a fourth schematic structural diagram of a near-eye display apparatus provided by an embodiment of the present disclosure.

FIG. 4 is a fourth schematic structural diagram of the near-eye display apparatus provided by an embodiment of the present disclosure.

With reference to FIG. 4, the light incident region and light emitting region of the waveguide plate 40 can also be arranged on opposite sides of the waveguide plate, the light incident region can be arranged on the side of the waveguide plate facing away from the human eyes, and the light emitting region is arranged on the side of the waveguide plate facing the human eye. In this way, the coupling-in grating 50 is arranged on the side of the waveguide plate 40 facing away from the human eye, and the super lens 60 is arranged on the side of the waveguide plate 40 facing the human eye.

The emitted light of a first image displayed on the first display screen 11 is converted into first circularly polarized light after passing through the first polarization converter 31 and enters the coupling-in grating 50 in the light incident region. The emitted light of a second image displayed on the second display screen 12 is converted into second circularly polarized light after passing through the second polarization converter 32 and enters the coupling-in grating 50 in the light incident region. The coupling-in grating 50 is configured to couple the first circularly polarized light and the second circularly polarized light into the waveguide plate 40 for conduction.

In the embodiments of the present disclosure, the coupling-in grating 50 is a diffraction grating, such as an embossment type diffraction grating. In this way, the grating structure can be directly fabricated on the surface of the light incident region of the waveguide plate 40 to achieve the purpose of grating coupling.

Figure 5:
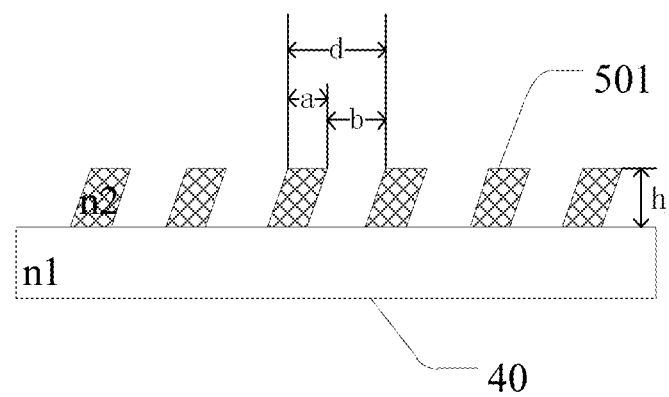
FIG. 5 is a schematic structural diagram of a coupling-in grating provided by an embodiment of the present disclosure.

FIG. 5 is a schematic structural diagram of the coupling-in grating provided by an embodiment of the present disclosure.

With reference to FIG. 5, the coupling-in grating 50 includes a plurality of grating structures 501 arranged periodically. The grating structures 501 are directly fabricated on the waveguide plate 40. Each grating structure 501 and an adjacent slit are connected to form a grating period. The refractive index of the waveguide plate 40 is n1, and the refractive index of the grating structure 501 is n2. As shown in FIG. 5, the width of the grating period is d, the width of the grating structure is a, and the width of the slit is b, so the duty ratio of the grating structure in one grating period is a/d.

According to the above-mentioned coupling-in grating, through regular structure design, the amplitude and phase of the incident light are periodically spatially modulated, and the incident light is divided into diffraction light of various orders, and the diffraction light is emitted at a certain diffraction angle and has high diffraction efficiency.

In the embodiments of the present disclosure, as shown in FIG. 5, the coupling-in grating is a tilted grating, and the vector direction of the grating structure 501 has a certain included angle with the optical axis. With this grating structure, the parameters of the grating can be adjusted. The −1 order or 1 order diffraction efficiency reaches more than 90%.

The function of the coupling-in grating 50 is to couple the emitted light from the first display screen 11 and the second display screen 12 into the waveguide plate 40 after the polarization state conversion, and conduction in the waveguide plate 40 needs to meet the condition of total reflection. The diffraction angle of 0 order diffraction is 0, which cannot satisfy the conduction condition of light in the waveguide plate 40. Therefore, the embodiments of the present disclosure use the grating height, grating refractive index, inclination angle and duty ratio of the coupling-in grating 50 to realize the high diffraction efficiency of the 1 order or −1 order, reaching about 90%.

For example, when the coupling-in grating 50 is a tilted diffraction grating, the grating height is set to 300 nm, the grating refractive index is 1.7, the tilt angle is 40°, and the duty ratio is controlled at 0.5, the −1 order diffraction efficiency can reach over 90%.

Figure 6:
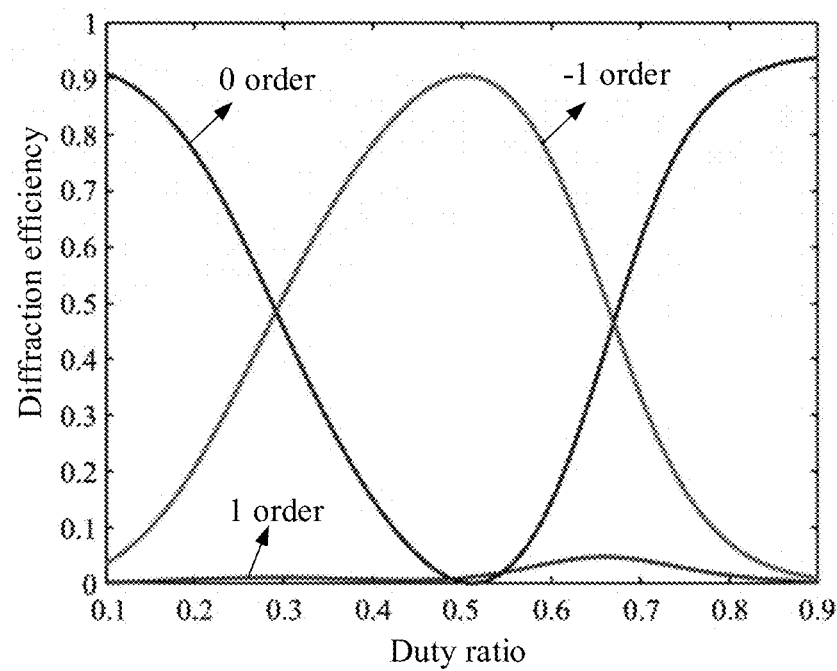
FIG. 6 is a schematic curve diagram of diffraction efficiency of various orders provided by an embodiment of the present disclosure.

FIG. 6 is a schematic curve diagram of diffraction efficiency of various orders provided by an embodiment of the present disclosure.

With reference to FIG. 6, the coupling-in grating 50 is optimized and simulated by Finite-Difference Time-Domain (FDTD), and the duty ratio of the coupling-in grating is adjusted. When the duty ratio reaches about 0.5, the −1 order diffraction efficiency can be maximized. At this time, the −1 order diffraction light has a higher intensity, and the diffraction angle of the −1 order diffraction light can meet the conditions for conduction in the waveguide plate 40. At the same time, the 0 order diffraction efficiency and the 1 order diffraction efficiency are both low, and therefore, the intensity of the −1 order diffraction light introduced into the waveguide plate 40 is the largest.

The above-mentioned diffraction grating provided by the embodiment of the present disclosure does not have a polarization-sensitive characteristic, so the first circularly polarized light and the second circularly polarized light are still the first circularly polarized light and the second circularly polarized light after passing through the coupling-in grating 50 and entering the waveguide plate.

The super lens 60 is located in the light emitting region of the waveguide plate 40, and is configured to focus the first circularly polarized light at the first focal length and the second circularly polarized light at the second focal length. The first focal length and the second focal length are different.

Based on the Berry phase principle, the super lens 60 can modulate the amplitude, phase, and polarization of incident light, and converge the incident left-handed circularly polarized light and right-handed circularly polarized light on different focal planes, thereby displaying two different images on the two focal planes.

Figure 7:
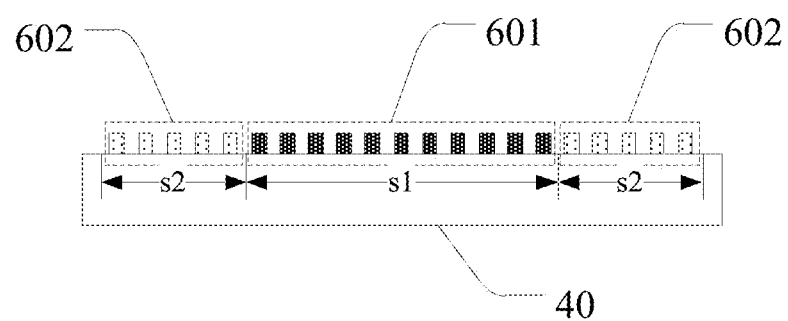
FIG. 7 is a schematic structural diagram of a super lens provided by an embodiment of the present disclosure.

FIG. 7 is a schematic structural diagram of the super lens provided by an embodiment of the present disclosure.

With reference to FIG. 7, the light emitting region of the waveguide plate 40 is divided into a first region s1 and a second region s2. The super lens 60 includes a plurality of first micro-nano structure units 601 distributed in the first region s1 and configured to focus the first circularly polarized light at the first focal length; a plurality of second micro-nano structure units 602 distributed in the second region s2 and configured to focus the second circularly polarized light at the second focal length; where, rotation angles of the first micro-nano structure units 601 and the second micro-nano structure units 602 are different.

The micro-nano structure units included in the super lens 60 are arranged at the order of the wavelength. When the micro-nano structure units with different rotation angles are designed to form a two-dimensional planar structure in a specific arrangement mode, the amplitude, phase, polarization or the like of the incident light can be flexibly regulated.

Figure 8:
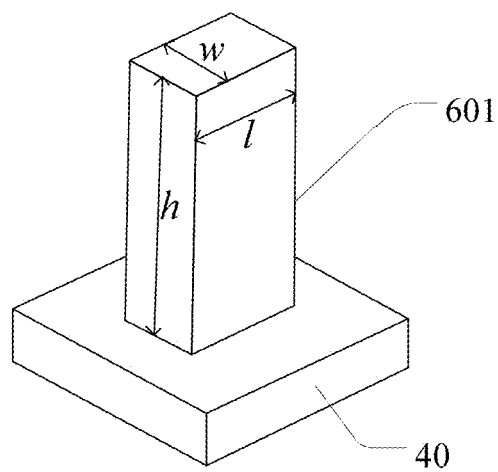
FIG. 8 is a schematic structural diagram of a micro-nano structure unit provided by an embodiment of the present disclosure.
Figure 9:
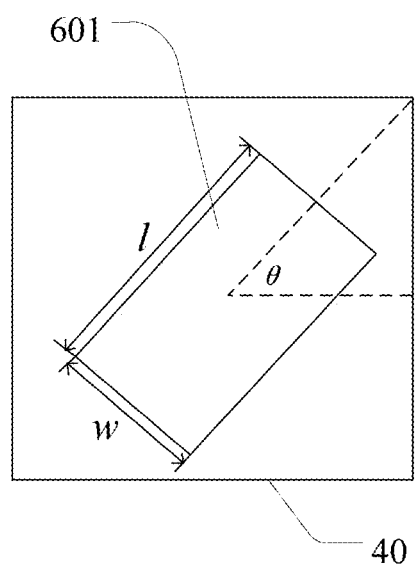
FIG. 9 is a schematic structural top view diagram of a micro-nano structure unit provided by an embodiment of the present disclosure.

FIG. 8 is a schematic structural diagram of the micro-nano structure unit provided by an embodiment of the disclosure, and FIG. 9 is a schematic overlook structural diagram of the micro-nano structure unit provided by an embodiment of the disclosure.

With reference to FIG. 8, the micro-nano structure unit is configured as a nanorod, where the length of the nanorod is l, the width is w, and the height is h. With reference to FIG. 9, the rotation angle of the nanorod is θ. The length, width and height of the nanorod are set at the order of nanometers, the first micro-nano structure units 601 and the second micro-nano structure units 602 mentioned above can be nanorods, and the rotation angles θ of the two kinds of nanorods are different.

The multifocal display based on the super lens in the embodiments of the present disclosure divides the super lens 60 into two regions, and the nanorods with different rotation angles modulate different focusing phases respectively, so that the incident first circularly polarized light and second circularly polarized light are respectively focused on two focal planes. The sizes of these micro-nano structure units are all at the sub-wavelength order, and they have the advantages of light weight, small size, high efficiency, and easy integration.

In the embodiments of the present disclosure, the parameter settings of the first micro-nano structure units 601 and the second micro-nano structure units 602 in terms of length l, width w, height h, and rotation angle θ meet the conditions of focusing the first circularly polarized light at the first focal length, and focusing the second circularly polarized light at the second focal length.

In some embodiments, assuming that the super lens 60 can focus the first circularly polarized light at the first focal length $f_1$ and the second circularly polarized light at the second focal length $f_2$, then the phase distribution of the light converged by the bifocal surface satisfies:

$$\varphi_1(x, y) = \frac{2\pi}{\lambda_{in}}\left(\sqrt{r^2 + f_1^2} - f_1\right); \quad r \in s1;$$

$$\varphi_2(x, y) = \frac{2\pi}{\lambda_{in}}\left(\sqrt{r^2 + f_2^2} - f_2\right); \quad r \in s2.$$

Where, $r=\sqrt{x^2+y^2}$, (x, y) represents the position of the micro-nano structure units in a coordinate system where the super lens is located, $\lambda_{in}$ represents the wavelength of the incident light, and $\varphi_1(x, y)$ represents the phase distribution of the first circularly polarized light after the first circularly polarized light passes through the super lens. $\varphi_2(x, y)$ represents the phase distribution of the second circularly polarized light after the second circularly polarized light passes through the super lens.

The length l, width w, and height h of the first micro-nano structure units 601 and the second micro-nano structure units 602 are optimized by FDTD, so that the phases in the x direction and y direction satisfy:

$$\varphi_x - \varphi_y = \pi.$$

Where, $\varphi_x$ represents the phase in the x direction, and $\varphi_y$ represents the phase in the y direction.

Therefore, values of the length l, the width w, and the height h of the first micro-nano structure units 601 and the second micro-nano structure units 602 are found.

The first micro-nano structure units 601 and the second micro-nano structure units 602 in this size satisfy the Berry phase principle, and the rotation angle of the first micro-nano structure units that phase-modulate the first circularly polarized light satisfies the following relationship:

$$\theta_1(x, y) = \frac{\pi}{\lambda_{in}}\left(\sqrt{r^2 + f_1^2} - f_1\right).$$

The rotation angle of the second micro-nano structure units that phase-modulate the second circularly polarized light satisfies the following relationship:

$$\theta_2(x, y) = -\frac{\pi}{\lambda_{in}}\left(\sqrt{r^2 + f_2^2} - f_2\right).$$

Where, $\theta_1(x,y)$ represents the rotation angle of the first micro-nano structure, $\theta_2(x,y)$ represents the rotation angle of the second micro-nano structure, $f_1$ represents the first focal length, $f_2$ represents the second focal length, and $\lambda_{in}$ represents the wavelength of the incident light.

Therefore, the first micro-nano structure units 601 determined by the above process are arranged in the first region s1 of the light emitting region of the waveguide plate 40, and the second micro-nano structure units 602 are arranged in the second region s2, so that the first circularly polarized light in the waveguide plate 40 is focused at the first focal length $f_1$, and the second circularly polarized light is focused at the second focal length $f_2$.

For example, in the embodiments of the present disclosure, the first micro-nano structure units 601 and the second micro-nano structure units 602 are nanorod structures, and the scanning ranges of the nanorods are respectively set as follows: the length ranges from 40 nm to 200 nm, such as 40 nm, 200 nm, etc.; the width ranges from 40 nm to 200 nm, such as 40 nm, 200 nm, etc.; and the height ranges from 200 nm to 500 nm, such as 200 nm, 500 nm, etc., so that the amplitude and phase distribution of the emitted light field can be obtained. Points, of which the amplitudes are uniform and the phases in the x direction and y direction meet $\varphi_x-\varphi_y=\pi$ are selected and then values of the length, width and height of the nanorod are determined. At this time, the nanostructure satisfies the Berry phase principle, the rotation angle of the nanorod is half of the two focusing phases, and finally the incident left-handed circularly polarized light and right-handed circularly polarized light are converged on different focal planes, thereby achieving display of two different images on two focal planes.

In the embodiments of the present disclosure, in order to ensure that the light intensities of the two focus positions are consistent, it is necessary to set the area of the first region s1 to be equal to the area of the second region s2. The shapes of the first region s1 and the second region s2 can be set according to actual requirements.

Figure 10:
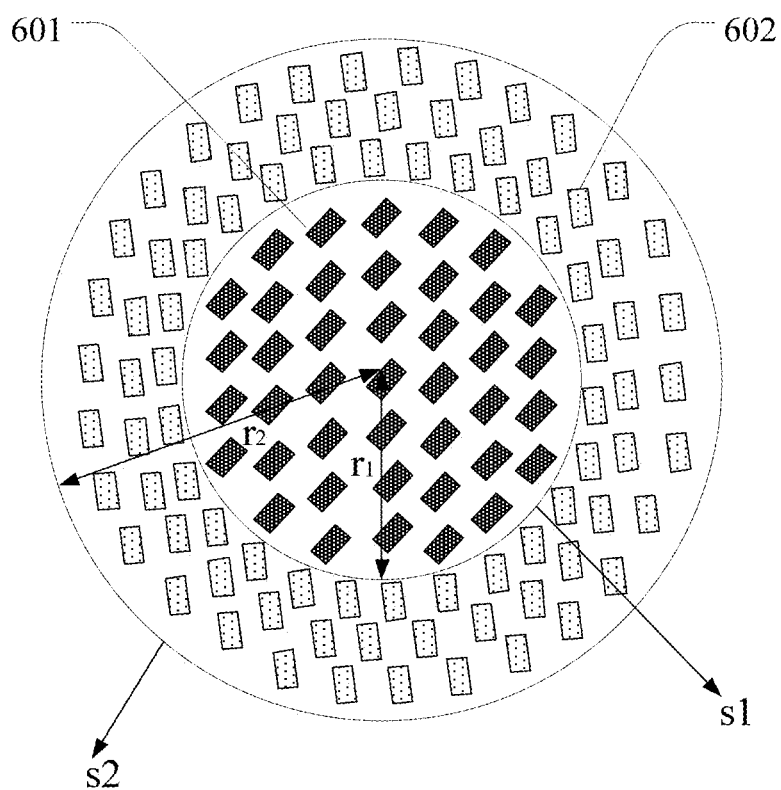
FIG. 10 is a first schematic distribution diagram of first micro-nano structure units and second micro-nano structure units provided by an embodiment of the present disclosure.
Figure 11:
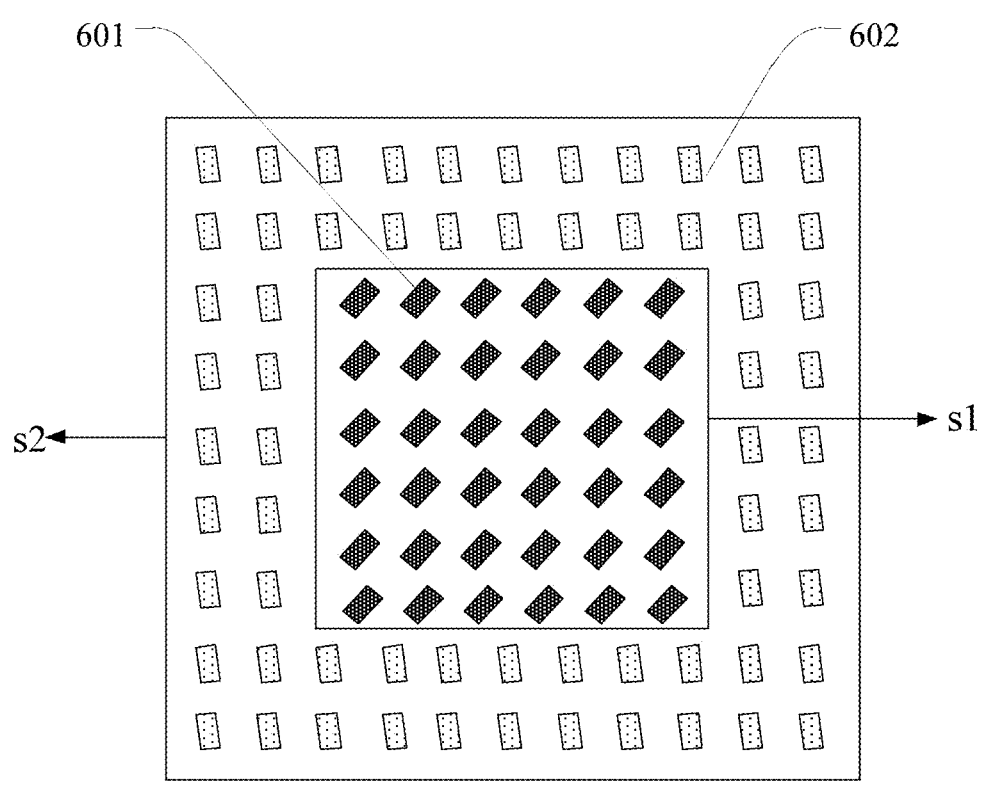
FIG. 11 is the second schematic distribution diagram of first micro-nano structure units and the second micro-nano structure units provided by an embodiment of the present disclosure.
Figure 12:
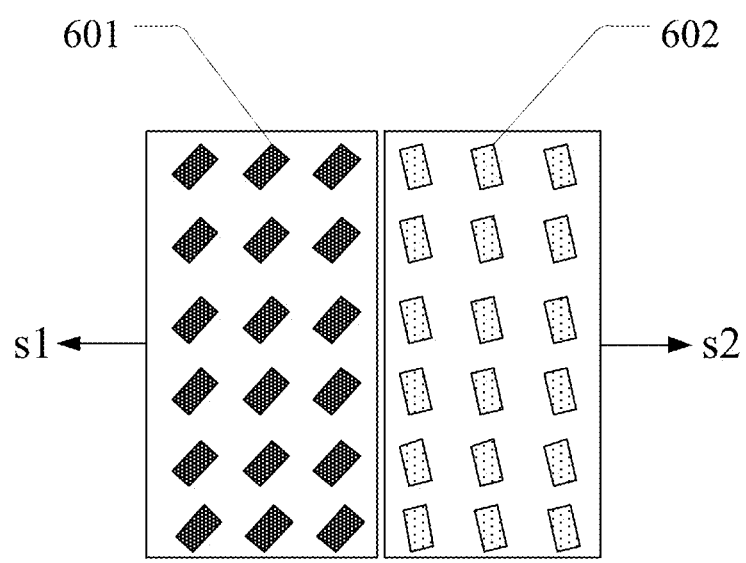
FIG. 12 is a third schematic distribution diagram of first micro-nano structure units and second micro-nano structure units provided by an embodiment of the present disclosure.

FIGS. 10-12 are schematic distribution diagrams of the first micro-nano structure units and the second micro-nano structure units provided by the embodiments of the present disclosure.

As shown in FIG. 10, the shape of the first region s1 may be set to be a circle, and the shape of the second region s2 may be set to be a circular ring surrounding the first region s1. The radius of the circle formed by the first region s1 is r1, and the radius of the circle corresponding to the outer edge of the circular ring formed by the second region is r2. Then when $2\pi r_1^2=\pi r_2^2$ is satisfied, the area of the first region s1 and the area of the second region s2 are equal. At this time, because of the first micro-nano structure units 601 distributed in the first region s1, and the second micro-nano structure units 602 distributed in the second region s2, the light intensities of the first image and the second image seen by the human eyes are consistent.

In addition, as shown in FIG. 11, the shape of the first region s1 may also be a square, and the shape of the second region s2 may be a square ring surrounding the first region s1. Similarly, the areas of the first region s1 and the second region s2 are equal. Because of the first micro-nano structure units 601 distributed in the first region s1, and the second micro-nano structure units 602 distributed in the second region s2, the light intensities of the first image and the second image seen by the human eyes are consistent.

As shown in FIG. 12, the first region s1 and the second region s2 can also be provided with rectangles of the equal area. The first region s1 and the second region s2 are arranged side by side. Because of distribution of the first micro-nano structure units 601 in the first region s1 and the distribution of the second micro-nano structure units 602 in the second region s2, the light intensities of the first image and the second image seen by the human eyes are consistent.

Figure 13:
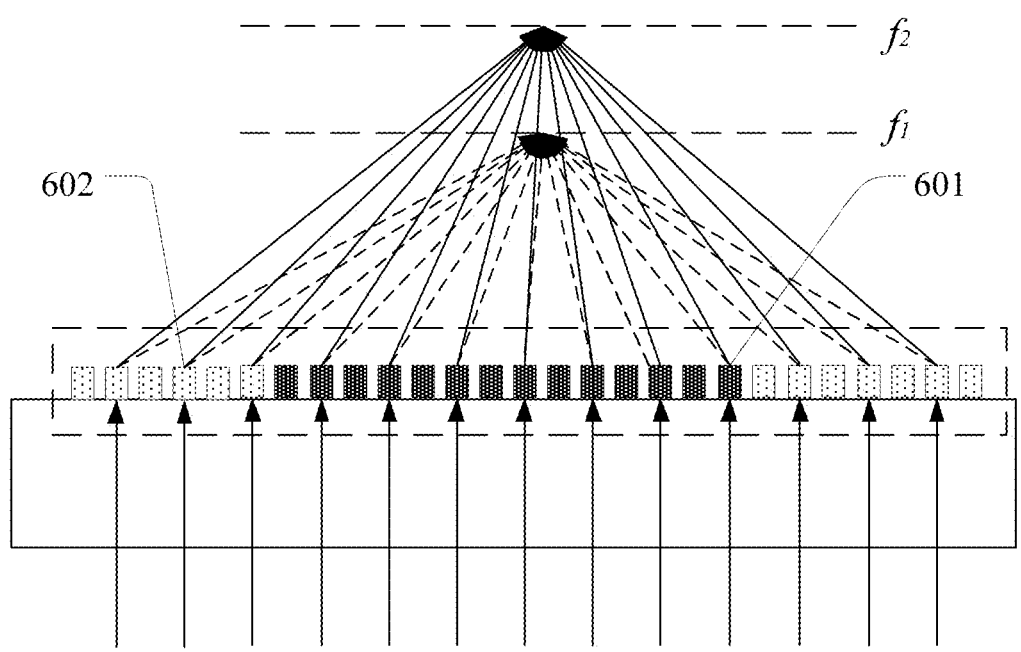
FIG. 13 is a schematic diagram of imaging of a super lens provided by an embodiment of the present disclosure.

FIG. 13 is a schematic diagram of imaging of the super lens provided by an embodiment of the present disclosure.

With reference to FIG. 13, after the first micro-nano structure units 601 and the second micro-nano structure units 602 of the super lens with the above structure arrangement are adopted, the first circularly polarized light (for example, left-handed circularly polarized light) incident on the super lens from the waveguide plate can be focused at the first focal length f1 after passing through the super lens, and the second circularly polarized light (for example, right-handed circularly polarized light) incident on the super lens from the waveguide plate can be focused to the second focal length f2 after passing through the super lens.

Figure 14:
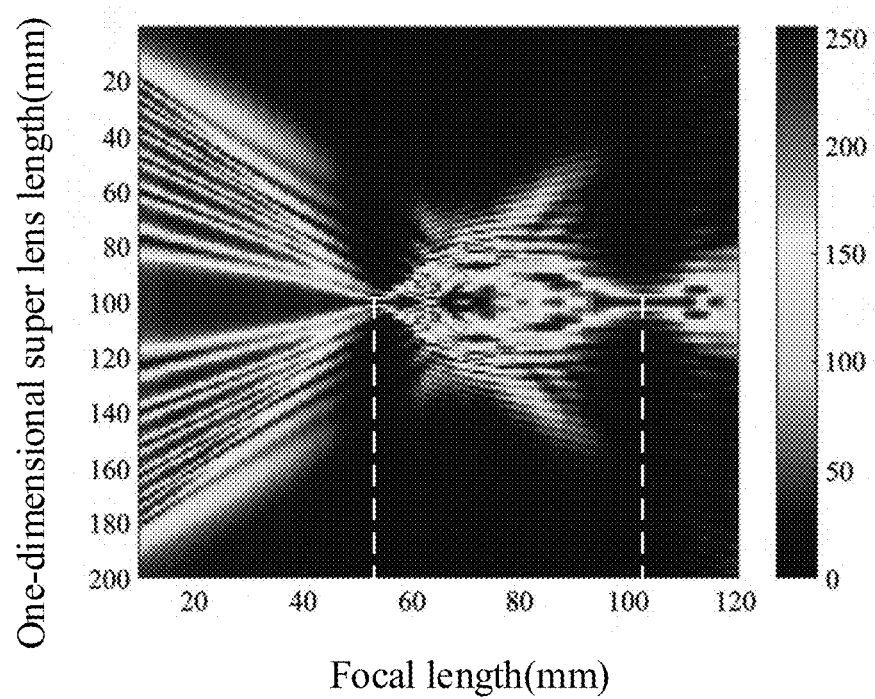
FIG. 14 is a bifocal simulation diagram of a super lens provided by an embodiment of the present disclosure.

FIG. 14 is a bifocal simulation diagram of the super lens provided by an embodiment of the present disclosure. Horizontal coordinates represent the focal length, and vertical coordinates represent the length of the one-dimensional super lens. As shown in FIG. 14, the embodiments of the present disclosure take the one-dimensional super lens as an example to illustrate that the super lens can generate two focal lengths for circularly polarized light with different rotation directions. After parameter adjustment, two focal lengths can be generated. The focal lengths correspond to positions near 55 mm and 100 mm respectively.

The first circularly polarized light focused by the super lens is converted from the first image, and the second circularly polarized light is converted from the second image. Then, after the first image and the second image are imaged by the super lens, the human eyes can observe two images that do not interfere with each other. Through the adjustment of human eyes, when the first image is observed, the display of the second image in the human eyes is blurred; and when the second image is observed, the display of the first image in the human eyes is blurred, so that dizziness caused by eye fatigue can be eliminated.

The above-mentioned near-eye display apparatus provided by the embodiment of the present disclosure may be a virtual reality or augmented reality device. Specifically, it can be set in the form of glasses, a helmet and the like, which is not limited here. The images displayed on the first display screen 11 and the second display screen 12 are finally seen by the human eyes through the imaging of the super lens, thereby achieving virtual reality display. At the same time, ambient light can directly pass through the waveguide plate and the super lens to enter the human eyes, so that the human eyes can see environmental sceneries. Combined with the image display of the near-eye display apparatus, augmented reality display can be realized.

The near-eye display apparatus provided by the present disclosure includes: the first display screen configured to display the first image; the second display screen configured to display the second image; the first collimating lens located on the light emitting side of the first display screen and configured to collimate emitted light of the first display screen; the second collimating lens located on the light emitting side of the second display screen and configured to collimate emitted light of the second display screen; the first polarization converter located on the light emitting side of the first display screen and configured to convert the emitted light of the first display screen into the first circularly polarized light; the second polarization converter located on the light emitting side of the second display screen and configured to convert the emitted light of the second display screen into the second circularly polarized light, wherein the rotation directions of the first circularly polarized light and the second circularly polarized light are opposite; the waveguide plate located on the side of the first collimating lens facing away from the first display screen, and the side of the second collimating lens facing away from the second display screen, wherein the waveguide plate is configured to conduct light rays and the waveguide plate includes: the light incident region and the light emitting region; the coupling-in grating located in the light incident region of the waveguide plate and configured to couple the first circularly polarized light and the second circularly polarized light into the waveguide plate for conduction; and the super lens located in the light emitting region of the waveguide plate and configured to focus the first circularly polarized light at the first focal length and the second circularly polarized light at the second focal length, wherein the first focal length and the second focal length are different. The first image displayed on the first display screen and the second image displayed on the second display screen are converted into the circularly polarized light with opposite rotation directions. After conduction by the waveguide plate, the super lens can focus the two types of circularly polarized light with the different rotation directions at different focal lengths to form two focal planes. The human eyes can observe two different images on different image planes. Through the adjustment of the human eyes, the second image is blurred when the first image is observed and the first image is blurred when the second image is observed, which is consistent with how the human eye feels while seeing an actual scenery, so that the dizziness problem caused by brain fatigue after long-time watching can be eliminated.

Although the preferred embodiments of the present disclosure have been described, those skilled in the art can make additional changes and modifications to these embodiments once they know the basic creative concept. Therefore, the appended claims are intended to be interpreted as including the preferred embodiments and all changes and modifications falling within the scope of the present disclosure.

Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:
1. A near-eye display apparatus, comprising:
   a first display screen configured to display a first image;

a second display screen configured to display a second image;

a first collimating lens located on a light emitting side of the first display screen and configured to collimate emitted light of the first display screen;

a second collimating lens located on a light emitting side of the second display screen and configured to collimate emitted light of the second display screen;

a first polarization converter located on the light emitting side of the first display screen and configured to convert the emitted light of the first display screen into first circularly polarized light;

a second polarization converter located on the light emitting side of the second display screen and configured to convert the emitted light of the second display screen into second circularly polarized light; wherein rotation directions of the first circularly polarized light and the second circularly polarized light are opposite;

a waveguide plate located on a side of the first collimating lens facing away from the first display screen, and on a side of the second collimating lens facing away from the second display screen; wherein the waveguide plate is configured to conduct light rays; and the waveguide plate comprises: a light incident region and a light emitting region;

a coupling-in grating located in the light incident region of the waveguide plate and configured to couple the first circularly polarized light and the second circularly polarized light into the waveguide plate for conduction; and a super lens located in the light emitting region of the waveguide plate and configured to focus the first circularly polarized light at a first focal length, and configured to focus the second circularly polarized light at a second focal length; wherein the first focal length and the second focal length are different.

2. The near-eye display apparatus according to claim 1, wherein the first polarization converter is located between the first display screen and the first collimating lens; or, the first polarization converter is located on the side of the first collimating lens facing away from the first display screen; and
the second polarization converter is located between the second display screen and the second collimating lens; or, the second polarization converter is located on the side of the second collimating lens facing away from the second display screen.

3. The near-eye display apparatus according to claim 1, wherein the first display screen and the second display screen are one of a liquid crystal display, an organic light emitting diode display, a micro organic light emitting diode display, a light emitting diode display, or a micro light emitting diode display.

4. The near-eye display apparatus according to claim 3, wherein the emitted light of the first display screen and the emitted light of the second display screen are linearly polarized light; and
the first polarization converter is a first phase retarder, and the second polarization converter is a second phase retarder.

5. The near-eye display apparatus according to claim 3, wherein the emitted light of the first display screen and the emitted light of the second display screen are natural light;
the first polarization converter comprises:
a first polarizer located on the light emitting side of the first display screen; and a first phase retarder located on a side of the first polarizer facing away from the first display screen; and
the second polarization converter comprises:
a second polarizer located on the light emitting side of the second display screen; and
a second phase retarder located on a side of the second polarizer facing away from the second display screen.

6. The near-eye display apparatus according to claim 4, wherein the first phase retarder and the second phase retarder are quarter-wave plates.

7. The near-eye display apparatus according to claim 5, wherein the first phase retarder and the second phase retarder are quarter-wave plates.

8. The near-eye display apparatus according to claim 1, wherein the light incident region and the light emitting region are located on a surface of a side of the waveguide plate facing a human eye; or, the light emitting region is located on a surface of a side of the waveguide plate facing the human eye, and the light incident region is located on a surface of a side of the waveguide plate facing away from the human eye.

9. The near-eye display apparatus according to claim 8, wherein the coupling-in grating is a surface embossment type diffraction grating; and grating parameters of the surface embossment type diffraction grating satisfy that −1 order or 1 order diffraction efficiency reaches over 90%.

10. The near-eye display apparatus according to claim 1, wherein the light emitting region is divided into a first region and a second region; and
the super lens comprises:
a plurality of first micro-nano structure units, which are distributed in the first region and configured to focus the first circularly polarized light at the first focal length; and
a plurality of second micro-nano structure units, which are distributed in the second region and configured to focus the second circularly polarized light at the second focal length; wherein
rotation angles of the first micro-nano structure units and the second micro-nano structure units are different.

11. The near-eye display apparatus according to claim 10, wherein the rotation angle of the first micro-nano structure units satisfies the following relationship:

$$\theta_1(x, y) = \frac{\pi}{\lambda_{in}}\left(\sqrt{r^2 + f_1^2} - f_1\right);$$

and
the rotation angle of the second micro-nano structure units satisfies the following relationship:

$$\theta_2(x, y) = -\frac{\pi}{\lambda_{in}}\left(\sqrt{r^2 + f_2^2} - f_2\right);$$

wherein, $\theta_1(x, y)$ represents the rotation angle of the first micro-nano structure units, $\theta_2(x, y)$ represents the rotation angle of the second micro-nano structure units, $f_1$ represents the first focal length, $f_2$ represents the second focal length, and $\lambda_{in}$ represents a wavelength of incident light.

12. The near-eye display apparatus according to claim 10, wherein an area of the first region is equal to an area of the second region.

13. The near-eye display apparatus according to claim 12, wherein a shape of the first region is a circle, and a shape of the second region is a circular ring surrounding the first region.

14. The near-eye display apparatus according to claim 1, wherein the first collimating lens comprises at least one lens; and the second collimating lens comprises at least one lens.

15. The near-eye display apparatus according to claim 14, wherein the lens in the first collimating lens is one of a spherical mirror, an aspheric mirror or a free-form surface mirror; and the lens in the second collimating lens is one of a spherical mirror, an aspheric mirror or a free-form surface mirror.

16. The near-eye display apparatus according to claim 1, wherein the near-eye display apparatus is an augmented reality device.

* * * * *